United States Patent [19]

Muranaka et al.

[11] 4,329,955

[45] May 18, 1982

[54] COMBUSTION CHAMBER OF AN INTERNAL COMBUSTION ENGINE

[75] Inventors: Shigeo Muranaka, Yokohama; Yasuo Nakajima, Yokosuka, both of Japan

[73] Assignee: Nissan Motor Co., Ltd., Yokohama, Japan

[21] Appl. No.: 129,865

[22] Filed: Mar. 13, 1980

[30] Foreign Application Priority Data

Mar. 19, 1979 [JP] Japan .................................. 54-34257

[51] Int. Cl.³ ............................................. F02B 3/00
[52] U.S. Cl. .................................... 123/260; 123/263; 123/265; 123/310
[58] Field of Search ................ 123/262, 263, 256, 265, 123/260, 310, 289, 290, 285, 657, 658, 661, 662, 667

[56] References Cited

U.S. PATENT DOCUMENTS

| 1,865,849 | 7/1932 | Gardiner ............................. 123/260 |
| 2,828,730 | 4/1958 | McDuffie ............................ 123/657 |
| 2,887,101 | 5/1959 | Mallinger ............................ 123/657 |
| 3,154,061 | 10/1964 | Henry-Biabaud ................... 123/661 |
| 4,000,722 | 1/1977 | May .................................... 123/263 |
| 4,026,250 | 5/1977 | Funiciello .......................... 123/262 |
| 4,121,544 | 10/1978 | May .................................... 123/263 |

*Primary Examiner*—Craig R. Feinberg
*Attorney, Agent, or Firm*—Thompson, Birch, Gauthier & Samuels

[57] ABSTRACT

A combustion chamber of an internal combustion engine has the form of a B-shaped chamber which consists of two spheroidal or spherical contiguous chambers which form an inwardly extending projection against which the air and fuel mixture impinges so as to be divided into two swirl flows which sweep residual burned gases of the previous cycle in the combustion chamber, thereby preventing knocking in the operation of the engine to improve the fuel consumption, driving performance and output of the engine.

5 Claims, 4 Drawing Figures

FIG._1
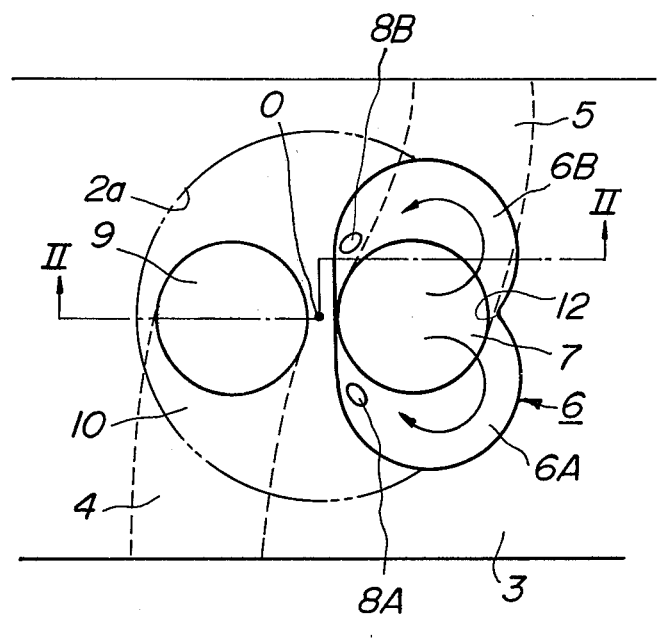
FIG.2
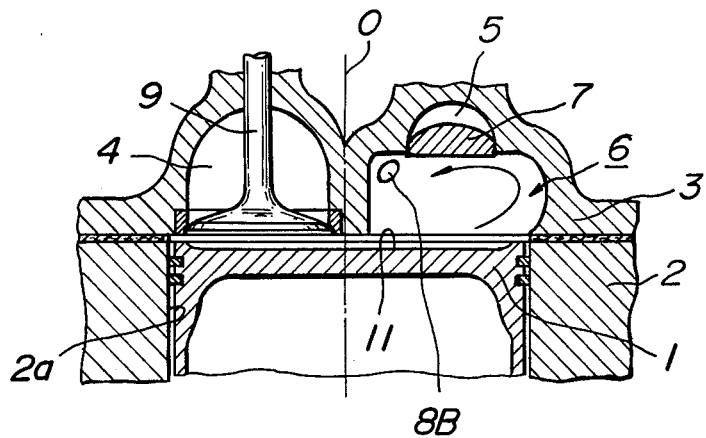

COMBUSTION CHAMBER OF AN INTERNAL COMBUSTION ENGINE

BACKGROUND OF THE INVENTION

1. Field of the Invention:

The invention relates to a combustion chamber of an internal combustion engine which prevents knocking in operation.

2. Description of the Prior Art:

An engine including cylinders each having a plurality of spark plugs has been known which performs rapid and stable combustion even when it is operated under an exhaust gas recirculation system with a relatively large amount of re-introduced exhaust gas which would cause unstable combustion in an engine including cylinders each having a single spark plug. Such a rapid and stable combustion greatly improves the fuel consumption and driving performance and greatly reduces the generation of nitrous oxides (NOx) in the exhaust gas.

With the conventional engine including cylinders each having two spark plugs, however, combustion chambers are hemispherical or disc-like and spark plugs are symmetrically located with respect to centers of cylinders. With this arrangement, when a higher compression ratio is employed to improve the engine efficiency, hot residual gases of the previous cycle present in the combustion chamber furthest from the spark plugs are insufficiently cooled and cause an extraordinary combustion such as knocking or preignition. To avoid this, the ignition timing must be delayed and deviated from the minimum advance for the best torque (MBT), with the result that the higher compression ratio cannot bring about the desired improved effect.

SUMMARY OF THE INVENTION

It is an object of the invention to provide an improved combustion chamber of an internal combustion engine which eliminates the disadvantages of the prior art, and which is capable of reliably cooling residual burned gases therein without losing the rapid combustion characteristics of the two spark plugs.

The combustion chamber of an internal combustion engine according to the invention comprises a plenum chamber formed in either the cylinder head or the piston. The plenum chamber consists of two small contiguous plenum chambers which form a B-shaped chamber, each chamber outwardly diverging at an obtuse angle in configuration, an exhaust valve whose valve head is located at the linked portion of the plenum chamber, two spark plugs arranged one on each side of the exhaust valve and adjacent to an intake valve whose valve head is exposed to a squish surface formed by inner surfaces of the cylinder head with exception of the plenum chamber, a groove formed in the squish surface, and a top surface of the piston in opposition thereto. The groove communicates between the squish surface and the proximity of an projection of an inner wall of the B-shaped plenum chamber.

The invention will be more fully understood by referring to the following detailed specification and claims taken in connection with the appended drawings.

BRIEF DESCRIPTION OF THE DRAWINGS

FIG. 1 is a bottom plan view of a cylinder head of an internal combustion engine illustrating one embodiment of the present invention;

FIG. 2 is a sectional view of the cylinder head with a piston taken along line II—II in FIG. 1;

DETAILED DESCRIPTION OF THE PREFERRED EMBODIMENT

Figure 3:
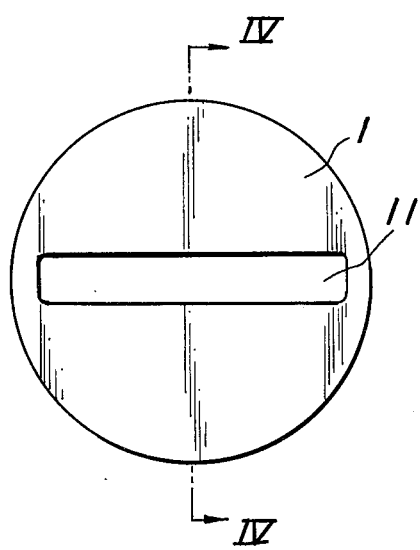
FIG. 3 is a plan view of the piston in FIG. 2.
Figure 4:
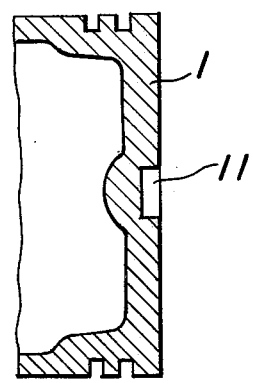
FIG. 4 is a sectional view of the piston taken along line IV—IV in FIG. 3.

FIGS. 1 and 2 illustrate a part of an internal combustion engine to which is applied the present invention, including a piston 1, a cylinder block 2 formed with a cylinder 2a, and a cylinder head 3. The cylinder head 3 is formed with an intake port 4 and an exhaust port 5 which are adapted to be closed and opened by means of an intake valve 9 and an exhaust valve 7, respectively, which are arranged in opposition to each other on both sides of a center axis of the cylinder.

A lower surface of the cylinder head 3 is flat with exception of a plenum chamber 6 to form a squish surface 10 which approaches and opposes a top flat surface of the piston 1 with a very small clearance when the piston 1 reaches a top dead center. A lower flat surface of the head of the intake valve 9 is substantially flush with the flat surface of the cylinder head 3. The plenum chamber 6 consists of two small contiguous plenum chambers 6A and 6B which are substantially spherical or spheroidal and which form a B-shaped plenum chamber diverging outwardly at an obtuse angle. The exhaust valve 7 extends downwardly at the linked portion of the plenum chamber 6. The small plenum chambers 6A and 6B are provided with spark plugs 8A and 8B at locations which are symmetrical with respect to the exhaust valve 7 and which are adjacent to the intake valve 9 as shown in FIG. 1.

The piston 1 has formed in its upper surface a groove 11 communicating the valve head of the intake valve 9 with the proximity of the center of the B-shaped plenum via a mid portion between the spark plugs 8A and 8B of the plenum chamber 6.

The effective functioning resulting from the above arrangement of the combustion chamber according to the invention will be explained hereinafter.

As piston 1 approaches the vicinity of the top dead center during its compression stroke, an air and fuel mixture between the upper surface of the piston 1 and the squish surface 10 of the cylinder head strongly flows into the plenum chamber 6 as a squish flow having a main flow in the groove 11 formed in the piston 1. Because of a wedge-like projection 12 in the plenum chamber as viewed in a horizontal cross-section, the squish flow impinges against the projection 12 so as to be divided into two swirl flows in the small plenum chambers 6A and 6B as shown in FIG. 1. Each swirl flow has a horizontal flow portion guided by the projection 12 and a vertical flow portion guided by the curved surface of the small plenum chamber 6A or 6B as shown in FIG. 2. With this arrangement, therefore, the divided squish flows sweep the hot residual burned gases of the previous cycle which are remote from the spark plugs 8A and 8B in the small plenum chambers 6A and 6B towards the spark plugs 8A and 8B so as to burn rapidly and effectively. As the result of this, in comparison with a conventional engine whose simply configured combustion chambers each have two spark plugs, the knocking can be remarkably prevented. Moreover, the main squish flow does not immediately or directly impinge against the spark plugs 8A and 8B when it enters the plenum chamber 6 but arrives there after swirling action without rapidly cooling the spark plugs 8A and 8B, thereby improving the ignition performance of the engine.

Although in the above embodiment the plenum chamber 6 and groove 11 are shown provided in the cylinder head and in the piston 1, respectively, it is to be understood that the plenum chamber and the groove may be provided in either one of the cylinder head and piston or may be partially provided in both of them.

Furthermore, the groove 11 is not necessarily extended through the mid portion between the spark plugs 8A and 8B. The groove 11 may extend in any manner so long as the main squish flow does not directly impinge against the spark plugs 8A and 8B. The number of the groove 11 may therefore be more than one.

Therefore, according to this invention, a plenum chamber is provided in either the cylinder head (preferably) or the piston. The wall of the plenum chamber is opened and closed by an exhaust valve. The plenum chamber is formed in a substantially B-shape (when viewed in plan) consisting of two contiguous spheroidal or spherical chambers. The non-plenum lower portion of the cylinder head opposes the piston upper surface and constitutes a squish surface. The upper surface of the piston is provided with a groove for cooperating with the squish surface. During the compression stroke of the piston, the groove channels the main squish flow into the plenum chamber and directs the flow against the plenum wall inward projection where it divides into two diverging curved vertical flows which sweep the hot residual burned gases of the previous cycle towards the spark plugs, thereby remarkably preventing knocking and therefore enabling compression ratio to be higher which in conjunction with the rapidly stabilizing combustion characteristics obtained by the two spark plug system can remarkably improve the fuel consumption, driving performance and output of the engine. If the compression ratio is substantially the same as that of the conventional engine, moreover, an engine having combustion chambers according to the present invention can operate at the optimum ignition timing even if a low-octane gasoline is used.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A combustion chamber of an internal combustion engine having a piston and a cylinder head, said combustion chamber comprising: a plenum chamber having a substantially B-shaped cross-section when viewed in plan, said plenum chamber being formed by two smaller contiguous plenum chambers which have at their juncture an inwardly extending wedge-like plenum chamber wall projection which is located substantially along a center transverse plane extending through said B-shaped plenum chamber, an exhaust valve having a valve head located adjacent said projection, two spark plugs flanking said exhaust valve on a side of said plenum chamber opposite to said wall projection, said exhaust valve head being bounded by said wall projection and said side wall opposite said wall projection, an intake valve having a valve head symmetrically located with respect to said two spark plugs and located diametrically across from said exhaust valve head with respect to cylinder head, the cylinder head having a lower, substantially flat, non-plenum surface forming a squish surface, a groove formed in at least one of said squish surface and the opposing upper surface of the piston, said groove communicating between said squish surface and the proximity of said wedge-like plenum chamber wall projection to carry the fuel-air mixture during the compression stroke towards said wall projection.

2. A combustion chamber as set forth in claim 1, wherein said small plenum chambers are spheroidal.

3. A combustion chamber as set forth in claim 1, wherein said small plenum chambers are spherical.

4. A combustion chamber as set forth in claim 1, wherein said groove extends between said spark plugs perpendicular to a vertical plane intersecting said spark plugs.

5. A combustion chamber as set forth in claim 1, wherein a plurality of said grooves is provided.

* * * * *

UNITED STATES PATENT AND TRADEMARK OFFICE
CERTIFICATE OF CORRECTION

PATENT NO. : 4,329,955
DATED : May 18, 1982
INVENTOR(S) : Shigeo Muranaka and Yasuo Nakajima It is certified that error appears in the above–identified patent and that said Letters Patent are hereby corrected as shown below:

After "[30] Foreign Application Priority Data, Mar. 19, 1979 [JP] Japan.....54-34257", insert --[U]--

Signed and Sealed this

Sixth Day of November 1984

[SEAL]

Attest:

Attesting Officer

GERALD J. MOSSINGHOFF

Commissioner of Patents and Trademarks